United States Patent [19]

Pavesi

[11] 4,349,094
[45] Sep. 14, 1982

[54] HYDRAULIC DEVICE FOR MODULATED ACTUATION OF FRICTION CLUTCHES

[75] Inventor: Franco Pavesi, Milan, Italy
[73] Assignee: Transfluid s.r.l., Milan, Italy
[21] Appl. No.: 930,212
[22] Filed: Aug. 2, 1978
[30] Foreign Application Priority Data
Aug. 16, 1977 [IT] Italy ............................... 26734 A/77
[51] Int. Cl.$^3$ ............................................. F16D 13/58
[52] U.S. Cl. ............................. 192/109 F; 192/85 R; 137/101
[58] Field of Search ................... 192/109 F, 3.57, 3.55, 192/85 R; 137/505.15; 91/451

[56] References Cited
U.S. PATENT DOCUMENTS

| | | | |
|---|---|---|---|
| 2,737,196 | 3/1956 | Eames | 137/101 |
| 3,421,532 | 1/1969 | Davidson | 137/101 |
| 4,027,474 | 6/1977 | Demase | 137/101 |

Primary Examiner—Kenneth Dorner
Attorney, Agent, or Firm—Blanchard, Flynn, Thiel, Boutell & Tanis

[57] ABSTRACT

The device comprises a cylinder-piston unit B, the chambers B1 and B2 whereof are connected with the delivery of control pump A and with the control member K2 of utilizer K1. The movable part 14 of the said cylinder-piston unit B is subjected to the influence of spring means 16 and presents a calibrated opening D, said opening being co-axial with the said cylinder-piston unit, while means 20 and 22 sensitive to the pressure building up in chamber B2 of the cylinder-piston unit B control the communication between the said chamber B2 and discharge A1. Said means 20 and 22 are combined with adjustable members 24, 28, 36 which counteract the action of the pressure building up in chamber B2 of the cylinder-piston unit B. It is thus possible to fill the actuating group K2 within a pre-determined period of time.

15 Claims, 5 Drawing Figures

HYDRAULIC DEVICE FOR MODULATED ACTUATION OF FRICTION CLUTCHES

This invention relates to an hydraulic device for gradual actuation of friction clutches.

In certain applications, the actuation of friction clutches is controlled hydraulically and with criteria adequate for tightening the clutch plates gradually in order to apply a uniform load to the operating machine.

Whilst the known types of hydraulic clutches are quite suitable to meet certain requirements, they often give rise to drawbacks due to the need to previously and completely fill the chambers of the driving elements and to successively pressurize same.

The present invention proposes a device by means of which the above drawbacks can be conveniently overcome and which permits at the same time, convenient modulation of the pressure of the actuating fluid for the friction couplings, thus ensuring that engagement occurs progressively with the increasing pressure applied over a given lapse of time, to permit gradual acceleration of the rotating masses and correct distribution of the operating machine load to the motor.

In particular, the invention is intended to provide means to control and modulate the supply pressure to the plate clutch actuating devices, combined with servo-actuated speed changes, i.e. of clutches used in vehicles and machines in general, particularly machine tools, so that tightening of the friction clutch plates takes place regularly over a fixed time interval, needed to draw into rotation and accelerate the rotating masses of the machine concerned.

The device covered by this invention is of a type which may be fitted in the discharge duct of pumps feeding the final actuator for example, a friction clutch. It is characterized by a cylinder-piston assembly the chambers of which are respectively connected with the pump's discharge and with the final actuator; and the moving part of which is influenced (on one of its surfaces) by force accumulating means, by at least one calibrated orifice fitted in parallel with said piston-cylinder assembly; by pressure sensing means for the pressure which forms from time to time in the second chamber of the piston-cylinder assembly and means being apt to control the communication between said chamber and the discharge and being combined with adjustable elements apt to oppose and control the action of the pressure in said second chamber, so that the filling of the liquid under pressure in the final actuation step, that is in the final actuator is effected in a fixed period of time during which the pressure of said liquid increases gradually and such limit pressure value is reacted, in the second chamber of the piston-cylinder assembly communication is established with the discharge and the limit pressure is held constant.

According to the present invention, the adjustable elements apt to oppose and control the action of the pressure which forms from time to time in the second chamber of the piston-cylinder assembly, can be replaced with spring-actuated means and/or fluid pressure means.

In one embodiment of the device of the present invention, said means consist in a cylinder containing two co-axial pistons, at least one whereof is spring-operated and provided with a calibrated orifice connecting the intermediate chamber with the chamber connected with the discharge of the pump feeding the chamber of the final actuator.

The invention will be now described in detail, in conjunction with the drawings annexed hereto by way of example:

Figure 1:
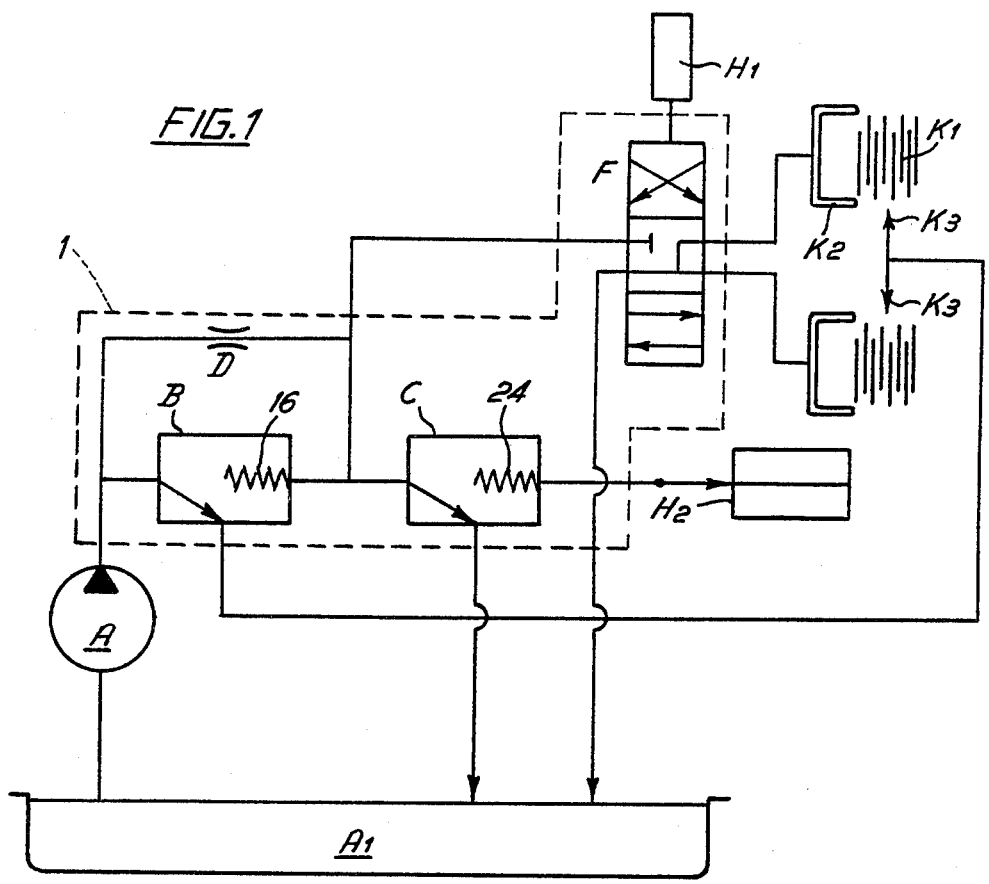
FIG. 1 is a sketch of the hydraulic loop used to actuate a friction clutch by means of the device according to the invention.

The hydraulic loop shown in FIG. 1 envisages a pump A which takes up oil from a tank or reservoir A1 and conveys it, through a first spring actuated valve B, to a set of nozzles K3 which lubricate the parts of the friction clutch K1 fitted between the drawup shaft and hub of any type of vehicle or machine.

The device according to the invention is provided with a second spring actuated valve C and with a calibrated orifice D, the latter being fitted in a branch-off on valve B. The spring actuated valve C governs the feed flow to the final actuator K2 of friction clutch K1 through a distributor F operated by a suitable control 14, to connect K2 either with the high pressure side of pump A or back to the reservoir A1 discharge. Spring actuated valve "C" is operatively connected with a control element H2 for either manual or remotely controlled operation. Parts B, C, D and F are outlined by broken line 1 in FIG. 1.

Figure 3:
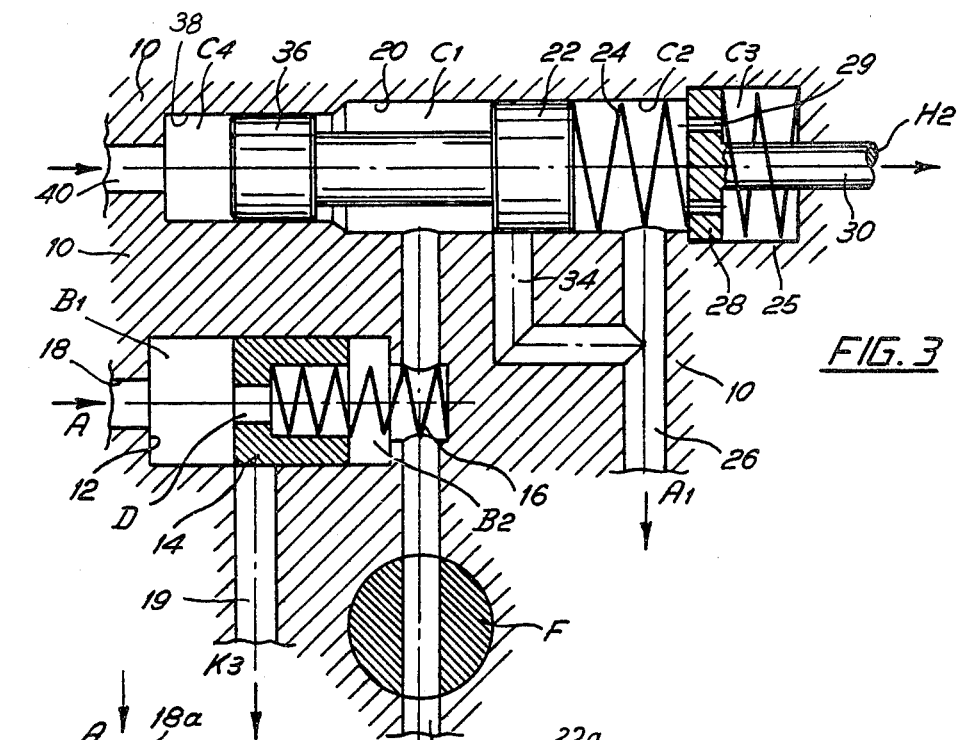
FIGS. 3 and 4 are schematic sections of two forms of embodiment of the device according to the invention.

With reference to FIG. 3, the device illustrated consists of a body 10 having a cylindrical cavity 12, in which operates tightly a piston 14 urged, on one of its faces, by a spring 16. The piston forms, within cavity 12, two opposite chambers B1 and B2 the first of which communicates, by a fitting 18, with the discharge side of pump A and by a further fitting 19, with nozzles K3 which lubricate clutch K1. The second chamber B2 (containing spring 16), communicates both with distributor F previously considered and with a second cylindrical cavity 20 relative to the spring actuated valve "C" in which operates tightly a piston 22 which forms two opposite chambers C1 and C2 and one of the faces of which is urged by the action of spring 24. Chamber C1 communicates directly with chamber B2 already considered, while chamber C2 communicates by means of a fitting 26 with discharge A1. Chambers B1 and B2 of valve R1 are connected to each other by a calibrated orifice D the diameter of which is calculated to permit a fluid flow rate based on what will be stated upon. Spring 24 acting on piston 22 is held on its other end by a pusher device 28, provided with orifices 29 which establish permanent communication between chambers C2 and C3. Pusher device 28 is guided on a runway coaxial with cavity 20 and which forms an axial stop for the pusher device which is secured to rod 30 connectable in turn to a manual control element H2, in relation to what will be stated upon. One of the faces of pusher device 28 is urged by the action of a counter-spring 25 inserted on rod 30 and secured to the bottom of chamber C3. The action of spring 25 on slider 28 is greater or at the limit equal to that of spring 24. Chamber C3 in cavity 20 behind pusher element 28 is permanently connected with chamber C2 through the holes 29 and said chamber C2 is connected by a take off (i.e. bypass) 34 with the previously considered chamber C1 whenever piston 22 compresses spring 24.

Again with reference to FIG. 3, piston 22 is provided at its extremity with a stem which holds a further piston 36, sliding in a cavity 38, co-axial with cavity 20; said further piston forms a further chamber C4 opposite to chamber C1. Said chamber C4 is connected by a fitting 40 with a pneumatic or hydraulic actuator (not shown) representing a remote control.

Figure 4:
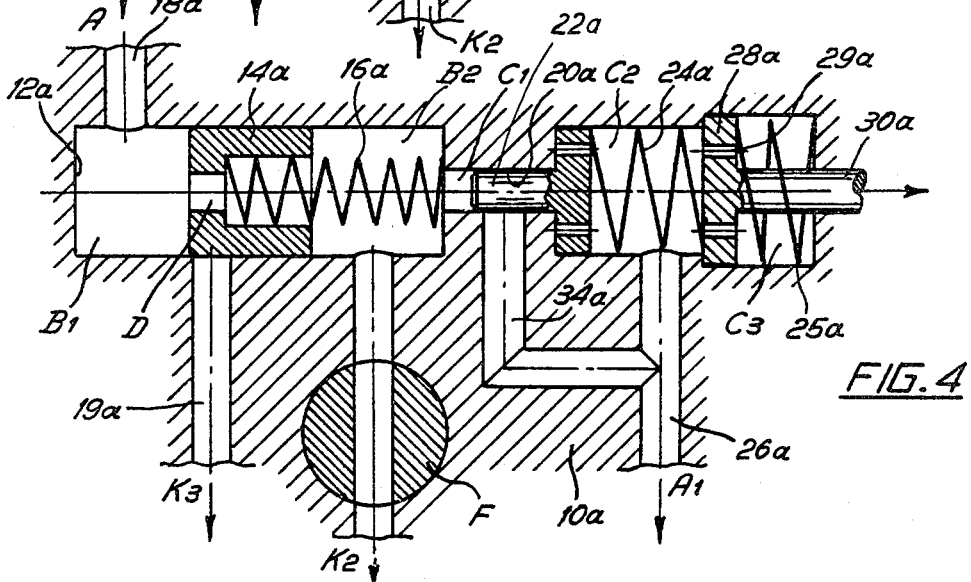

The structure of the device as illustrated in FIG. 4 is simplified with respect to FIG. 3 and equal or corresponding parts are identified with the same symbols, followed by a letter "a".

In this version, chamber B2 in addition to being connected with fittings A and K2 through distributor F, is connected with a further cavity 20a, smaller in diameter than cavity 20 of FIG. 3 and which forms chamber C1 in communication with chamber B2. A small piston 22a operates in chamber C1, said small piston being urged by the action of spring 24a to control opening 34a, connected by fitting 26a to discharge A1. In this version too the action of springs 24a and 25a urges pusher element 28a. The action of spring 25a is greater than that of spring 24a.

With regard to the operating characteristics of the device, surfaces S1 and S2 of pistons 14 and 22 have a size ratio suitable to attain the desired action.

Because of the the characteristic of the invention it ensues that the sizing of valve C and its reaction in relation with its related accessories is reduced and limited with respect to the other known types; this affords considerable advantages as the overall dimensions and in particular as the actuating force required to operate pusher device 28. From the above description, the operation of the device is evident.

Considering that pump A operates continuously, it establishes in chambers B1 and B2 (communicating with each other through calibrated orifice D), and C1 operating pressures the conditions of equilibrium of which are determined by the equation $$P1 = P2 + \frac{M1}{S1} = \frac{M2}{S2} + \frac{M1}{S1}$$

where

P1 and P2=the pressures in chambers B1 and B2;
M1 and M2=loads on springs 16 and 24;
S1 and S2=cross sections of pistons 14 and 22.

Moreover, in the initial conditions considered an equilibrium is also established between the flows in the different chambers of the device, bearing in mind that in this case as shown in FIG. 1, the pressure values can be adjusted so that the travel of piston 14 is limited in opposition to the action of spring 16, to permit entering into duct 19 of a small quantity of oil for nozzles K3. When control K2 of clutch K1 is operated, the flow rate of the lubricant to nozzles K3 is not interrupted; as a consequence overheating and irregular transmission of the motion between the fixed and moving parts of clutch K1 are avoided. In the present invention this result is achieved without the use of flow splitting facilities.

The operation of distributor F opens the communication between chamber B2 and control device K2 of clutch K1; in this case pressure P2 in said chamber B2 drops to zero pressure while pressure P1 in chamber B1 drops to a value given by the ratio between the force exerted on surface S1 of piston 14 by the action of spring 16. The oil under pressure flows from chamber B2 to the device K2 of clutch K1 to fill the chamber of K2. When this condition is present, the pressure in chamber C1 starts to rise and increases gradually until the action of spring 24 on piston 22 is neutralized. This is clearly noted by observing the trend of the curve on diagram 2 from which it emerges that on achievement of the maximum pressure value, piston 22 is shifted in opposition to the force of spring 24 while the said maximum pressure value remains constant. This also happens because the excess delivery of pump A is discharged through take off 34 the orifice of which is more or less opened by the shifting of said piston 22.

Figure 2:
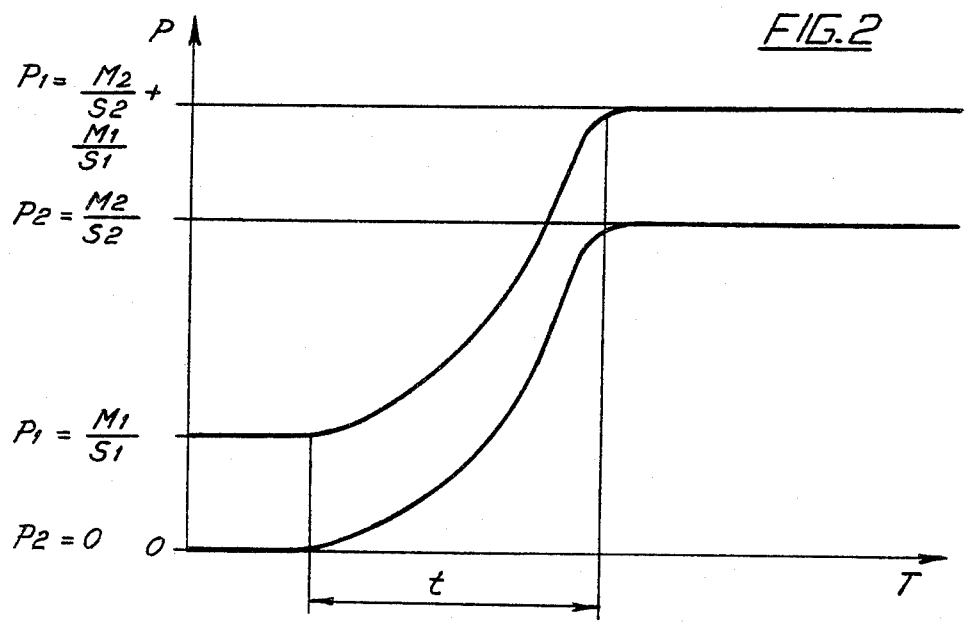
FIG. 2 is a diagram showing the pressure trend as a function of time in the friction clutch controlled by the device according to the invention.

According to the invention and as shown on the diagram of FIG. 2, the maximum value of the pressure established in chambers B2 and C1 is varied by the users by shifting slider 28 that is, by moving it away from the relevant stop to vary the compression of spring 24.

The time of increase of pressures P1 and P2 is practically constant and depends on the predetermined diameter of calibrated orifice D and load of opposing spring 16 acting on piston 14. These last mentioned values are practically constant and can be determined in advance according to requirements to be met in each case. Returning distributor F to the neutral position shown in FIG. 1, the supply loop previously considered is interrupted and device K2 of clutch K1 is connected to discharge A1.

The operating criteria of the device according to this invention are utilized rationally and practically when the device is used to operate clutches combined with speed variators in vehicles. In this case operation can be performed manually or by depressing a pedal connected to rod 30 considered hereinabove. It is thus possible to vary the load of spring 24 and therefore also of pressure P2 present in chambers B2 and C1 up to a value close to zero so that the engagement of the clutch elements may vary from the loose state (with the elements sliding on each of them) to a tight state achieved over a very short time. In like manner it is possible to achieve an equal result in the case of the device shown in FIG. 3 by building up in chamber C4 a pressure P3 apt to oppose the action of spring 24 and hence regulate pressure P2 in chamber B2. It ensues that to every position assumed by the load control device of spring 24, that is by pusher 28, corresponds a given value of pressure P2 and consequently of the torque transmitted to hydraulic coupling K1. In case the device according to the invention is used to actuate the clutch in a motor vehicle, a control of the advancement of the vehicle is obtained independently from the running condition of the motor (inching control).

It ensues that without the aid of further valve devices it is possible to obtain an automatic gradual increase of the pressure in chamber B2 (which houses the opposing spring 16) whenever the pressure in said chamber varies, for example when the load on spring 24 and/or pressure in chamber C4 changes. Moreover, to vary operating time T of the device, the action of spring 16 can also be varied by adjustable means acting on said spring to vary its load and the liquid flow through calibrated orifice D.

The device described and illustrated, is suitable for a wide range of applications and hence also of the relevant advantageous embodiments.

Figure 5:
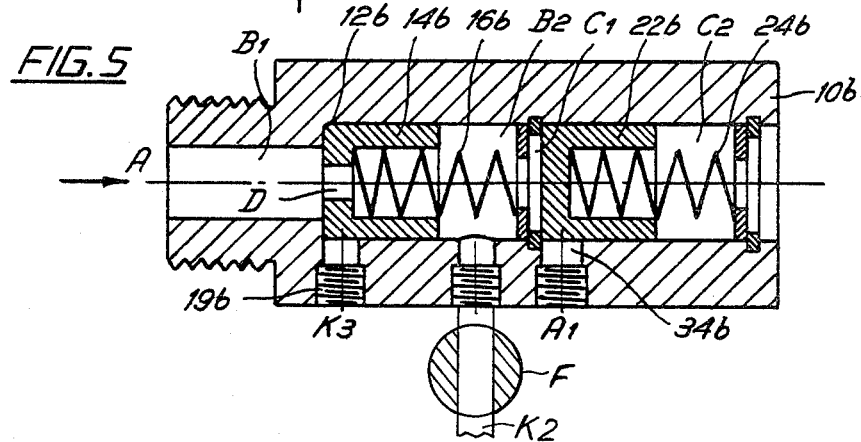
FIG. 5 is the axial section of a further version of the device.

FIG. 5 of the drawings shows an advantageous embodiment 1 which can be widely applied in view of its limited dimensions, in the sense that it can be incorporated in any type of friction clutch. The structure of the device shown in FIG. 5 is simplified with respect to both FIG. 3 and FIG. 4 and, again, equal or corresponding parts are identified with the same symbols, followed by the letter "b".

The device as seen in FIG. 5 departs from the devices above described, in that the body 106 of device 10b consists of a hollow tube in the cavity of which are fitted, co-axially and in succession pistons 14b and 22b with their related springs 16b and 24b, said spring and piston units being backed by elastic rings housed in suitable grooves of the hollow tube. It is clear that further modifications of the device can be realized in relation to different uses; as already stated, the device may form an integral part of the clutch or any other of the parts of the hydraulic system to feed the clutch itself. Among the possible different applications of the device, in addition to those considered above, applications can be mentioned which require control with pressure variation according to a parabolic or substantially parabolic trend, i.e. as illustrated in FIG. 2.

Regardless of the variations introduced, the invention will remain within the domain of the patent.

I claim:

1. A device for modulated operation of a pressure fluid actuator for a clutch, and a supply duct for supplying actuating pressure fluid to said clutch from a fluid pressure source, said device being fitted in the supply duct from the pressure source to the clutch, the device comprising:

a cylinder-piston assembly having first and second chambers connected respectively with the pressure source end of said duct and to the actuator end of said duct and having a movable part urged in one direction by force accumulating means, and at least one calibrated orifice in parallel to said cylinder-piston assembly, said cylinder-piston assembly including a cylinder, said movable part of said cylinder-piston assembly comprising a piston reciprocable in said cylinder and dividing said cylinder into said chambers, said calibrated orifice extending axially through said piston and maintaining communication between said chambers, the first one of said chambers being open to said supply duct from the pressure source and the second said chamber being open to the part of the duct connected to said clutch, a passage for supplying fluid to lubrication nozzles of said clutch, said passage opening to said first chamber in one position of said piston and being blocked in another position of said piston, said force accumulating means comprising spring means urging said piston toward said first chamber and into said blocking relation with said passage;

means for sensing the pressure in the second chamber of said cylinder-piston assembly, said sensing means including means for controlling communication between said second chamber and a discharge port and combined with means for controlling and counteracting the pressure in said second chamber so that the filling of said actuator is effected in a fixed period of time during which the pressure of the fluid within said second chamber increases gradually and once limit pressure is attained within the second chamber of the cylinder-piston assembly a connection is established with said discharge port, said limit pressure being maintained practically constant, said controlling and counteracting means including a further cylinder containing a further piston dividing said further cylinder into third and fourth chambers, said third chamber communicating with said second chamber and defining part of said sensing means, further spring means urging said further piston toward said third chamber, said further piston being shiftable toward said fourth chamber against said further spring means, a further passage connected to said discharge port and thence connectable to the return side of said pressure source and opening to said third chamber with said further piston urged against said further spring means into said fourth chamber and closable by said further piston with the latter advanced into said third chamber by said further spring means.

2. A device for hydraulically activating a friction clutch from a pump having a supply side and a return side, the device comprising:

a housing;

a first piston inserted in parallel between said supply side and said return side of said pump, first spring means, said first piston being sensitive to the pressure at said supply side of said pump and being influenced by said first spring means, first and second chambers separated by said first piston, said second chamber being connectible to apply fluid pressure to operate said clutch;

a calibrated port which connects said two chambers and is sensitive to the pressure at said supply side of said pump;

spring activated means sensitive to the fluid pressure applied to operate said clutch, said spring activated means including a second piston located to control communication between said return side of said pump, said valve housing having separate bore portions respectively guiding said first and second pistons so that said first and second pistons are individually housed in said housing and movement of one is independent of movement of the other.

3. The device of claim 2 in which said calibrated port is provided in said first piston, said spring activated means including a second spring means urging said second piston against the pressure in said second chamber.

4. The device of claim 3 in which said housing includes first second and third fluid outlets exiting separately from said housing, said fluid openings extending to respective points on the periphery of said bore portions, said first fluid opening being normally blocked by said first piston but being at least partially openable to said first chamber by shifting of said first piston against the force of said first spring means in response to the pressure of said pump, said second fluid opening communicating with said second chamber said third fluid opening being normally blocked by said second piston but openable to said second chamber by shifting of said second piston against the force of said second spring means.

5. The device of claim 4, including a clutch lubricant supply line connected to said first fluid opening, a normally closed clutch activating valve connected to said second fluid output and selectively openable to activate said clutch, and a return conduit connected to the return side of said pump and to said third fluid outlet.

6. The device of claim 2 including an adjustable means, said spring activated means including a second spring, said adjustable means being connected to said spring of said spring actuated means to vary the effect of said first piston and spring activated means.

7. The device of claim 2 including means manually actuable for displacing said piston of the said spring activated means independently of pressure fluid applied to said piston and thus independently of the pressure required to activate the friction clutch.

8. The device of claim 2 in combination with a friction clutch of the kind having segments to be lubricated and having nozzles directed thereat for applying a flow of lubricant to said friction clutch segments controlled by said piston, in which said first piston is positioned to control the influx of lubricant to the friction clutch.

9. In combination:
   a pressure fluid operated clutch having a pressure fluid actuator;
   a device for modulated operation of said clutch;
   a supply duct for supplying actuating pressure fluid to said clutch from a fluid pressure source, said device being fitted in the supply duct from the pressure source to the clutch;
   said device comprising a cylinder-piston assembly having first and second chambers connected respectively with the pressure source end of said duct and to the actuator end of said duct and having a movable part urged in one direction by force accumulating means, and at least one calibrated orifice in parallel to said cylinder-piston assembly for admitting pressure fluid from said supply duct to said second chamber;
   a valve in said duct selectively openable for passing pressure fluid from said second chamber to said clutch actuator for initiating actuation of said clutch;
   said device further comprising means for sensing the pressure in the second chamber of said cylinder-piston assembly, said sensing means including means controlling and counteracting the pressure in said second chamber for filling of said actuator in a fixed period of time by permitting gradual increase of the pressure of the fluid within said second chamber to a limit pressure and means for controlling communication between said second chamber and a discharge port leading to the input side of the pressure fluid source for opening said communication when said limit pressure is attained and then maintaining said limit pressure.

10. The device of claim 9, in which said clutch includes discs and nozzles directed for lubricating such discs, a passageway connecting said first chamber to said nozzles and normally closed by said movable part of said cylinder piston assembly, said clutch disc lubricant passageway being connected to said first chamber at a location opened by said movable part upon opening of said valve in said duct, so as to supply lubricant to said clutch discs at the beginning of actuation of such clutch.

11. Device according to claim 1, wherein said means controlling and counteracting the pressure in the second chamber of cylinder-piston assembly comprises fluid pressure means.

12. Device according to claim 11, including an additional cylinder-piston assembly defining said sensing means and means controlling and counteracting the pressure, said additional cylinder-piston assembly having one pressure chamber which may be connected with a pressure generator which may be actuated by the operator and a first piston which is operationally connected with a second piston of said adjustable means for the pressure which is formed from time to time in said second chamber of the first mentioned piston-cylinder assembly.

13. Device according to claim 12, in which said first and second piston are connected to each other and form a common chamber connected to said second chamber of the first-mentioned cylinder-piston assembly, said second piston also facing into a second chamber connected with a duct to said operator controlled pressure generator.

14. Device according to claim 1, wherein said means for controlling pressure in the second chamber includes a moving part influenced by spring means held by a pusher actuated by the user to vary the spring load and hence the pressure acting on said moving part.

15. Device according to claim 14, wherein said pusher is combined with stopping means and influenced by further spring means the action of which is at least as great as that of the first mentioned spring means acting on said moving part of said means governing the pressure in said second chamber.

* * * * *

UNITED STATES PATENT OFFICE
CERTIFICATE OF CORRECTION

Patent No. 4 349 094    Dated September 14, 1982

Inventor(s) Franco Pavesi

It is certified that error appears in the above-identified patent and that said Letters Patent are hereby corrected as shown below:

Column 6, line 47;   "first second" should read
                     ---first, second"

Column 8, line 13;   change "claim 1" to ---claim 9---.

line 35;     change "claim 1" to ---claim 9---.

Signed and Sealed this

Eighth Day of February 1983

|SEAL|

Attest:

GERALD J. MOSSINGHOFF

Attesting Officer    Commissioner of Patents and Trademarks